United States Patent Office 2,872,414
Patented Feb. 3, 1959

2,872,414

PROCESS FOR TREATMENT OF BOILER FEED WATER

John Alan Gray, Northwich, England, assignor to Imperial Chemical Industries Limited, London, England, a corporation of Great Britain No Drawing. Application December 8, 1955
Serial No. 551,734

Claims priority, application Great Britain December 20, 1954

5 Claims. (Cl. 210—55)

This invention relates to a process for the treatment of water for steam generation in boilers, and more particularly to those boilers and waters with which operating pressures and other conditions are such that calcium carbonate is precipitated inside the boiler.

When boiler feed water is softened and conditioned before it enters the boiler system any compounds precipitated as a result of the treatment may be removed by settling or filtering and consequently find their way into the boiler only in such small amounts as cause little trouble during steam generation. It is different when the water treatment is applied to water already in the boiler or in a feed vessel not arranged for settling for then nearly all precipitation of compounds takes place in the boiler and causes sludges to be formed. Such sludges consist to a large extent of calcium carbonate since waters used for steam generation contain in the raw state more calcium compounds than any others, for example magnesium compounds; some contain silicon compounds and a few contain aluminium compounds, but the amounts of the former are usually small in relation to the calcium compounds, and the amounts of aluminium compounds usually do not exceed one or two parts per million expressed as $Al_2O_3$. Sometimes these sludges are free-flowing and may be prevented from accumulating by blowing-down the boiler at intervals. The frequency with which this has to be done is generally governed by the maximum content of dissolved and suspended solids the boiler water can carry without foaming. Sometimes the sludges are less free-flowing and resist removal by blowing-down but can still be removed from the empty boiler by means of a jet of water. Sometimes they form deposits that cement together insoluble particles formed elsewhere and then they are too compacted to be removed except by mechanical means such as chipping or scraping. It follows that sludges that are not free-flowing enough to be removed by blowing-down are a cause of increased cleaning and maintenance costs and can, if not removed, lead in the end to failure of the boiler through overheating of metal heat-transfer surfaces and through other causes.

It is an object of this invention to provide a process for treating boiler feed water whereby all solids precipitated are in the form of a sludge that is free-flowing and non-adherent and consequently able to be removed by blowing-down.

A further object of the invention is to provide a process for treating boiler feed water that in addition to rendering boiler sludges free-flowing will prevent or reduce to negligible amount the formation of calcium carbonate scale on surfaces inside the boiler.

It is known that to be free-flowing and easily removed by blowing-down a sludge should in general be highly flocculent. It then has a high water content, of the order of 80% calculated on the settled sludge, is readily maintained in suspension by circulating water and if allowed to settle does not compact to a dense deposit but is taken up into suspension again when circulation is resumed, or flows towards a blow-down outlet.

Various chemicals are commonly used to improve the mobility of sludges, for example tannins, starch and sodium aluminate. The latter is sometimes useful in combination with starch or tannin when the magnesium hardness of the feed water is more than 15% of the total hardness; in some such cases where the magnesium content of the water is low it is advantageous to raise it by additions of suitable magnesium compounds. Starch and tannins are known to modify the types of precipitates produced in the boiler and it has usually been considered that the presence of a flocculent magnesium aluminate gel in a sludge was the essential factor in making the sludge free-flowing, though as far as is known the use of sodium aluminate, starch, tannin and other materials has been on an empirical basis and not related in any recognisably regular way to feed water composition.

I have now discovered that contrary to the commonly held belief that behaviour of a sludge is mainly dependent on the amount of aluminium compounds present in the environment it is in fact the concentration of magnesium compounds that is decisive. I have also discovered how to relate numerically the concentration of magnesium compounds required to make a sludge free-flowing to the concentrations of other substances present in a feed water.

According to my invention a process for treating boiler feed water for steam generation is characterised in that the concentration of magnesium compounds in the feed is so adjusted that the value of the expression $$\frac{100}{CaO}\left[\frac{MgO}{3} - \frac{2}{3}SiO_2\right]$$

in which CaO, MgO and $SiO_2$ are repectively the equivalents in moles of the calcium, magnesium and silicon compounds in the feed, is greater than 4 and preferably greater than 7.

It should be emphasised that any adjustment of the concentration of magnesium compounds in a feed water in accordance with the above expression of my invention is supplementary to, and in no way replaces, the normal alkaline treatment given to such waters, and it should be accordingly understood that the operation of my invention is dependent on the maintenance in the water of that degree of alkalinity which normally follows from alkaline treatment by known standard methods, for example by addition of sodium carbonate or sodium bicarbonate or caustic soda. This degree of alkalinity can conveniently be expressed as equivalent to 500 parts per million of sodium carbonate.

The process of my invention is applicable to all feed waters generally used for industrial purposes. Such waters may conveniently be classified as (i) waters of lakes and streams in moorland country, (ii) waters of lakes, reservoirs, rivers and canals in lowland country, (iii) water from wells, springs and lower measures of coal mines. In the first of these classes the water is soft; the combined concentration of dissolved calcium and magnesium compounds is in general in the range of about 0–50 parts per million (expressed as $CaCO_3$), and the concentration of silicon compounds is from 0–10 parts per million (expressed as $SiO_2$). Waters of the second and third classes stretch from those moderately soft to those that are very hard; the concentrations of dissolved calcium and magnesium compounds falling roughly within the range 50–300 and 10–75 parts per million (expressed as $CaCO_3$) respectively, the concentration of silicon compounds being about 10–15 parts per million (expressed as $SiO_2$) as a rule.

As discussed above, most boiler sludges consist of calcium carbonate. This comes about because internal boiler treatment, which is most commonly applied in the large numbers of boilers operating at pressures less than about 200 lb./sq. inch or at any pressure at which calcium carbonate can be precipitated, usually takes the form of additions of sodium carbonate or caustic soda, along with various other auxiliary materials such as sodium aluminate, phosphates, tannins, starch. The sodium carbonate or caustic soda reacts with the soluble calcium compounds responsible for most of the hardness of the feed water and precipitates calcium carbonate as a result.

I have found from an examination of numerous boiler sludges that the least mobile are composed almost entirely of calcium carbonate in the form of calcite. Free-flowing sludges we find on the other hand to contain proportions of one or more of serpentine $$(3MgO.2SiO_2.2H_2O)$$

kaolinite ($Al_2O_3.2SiO_2.2H_2O$) and magnesium hydroxide. In general non-mobile sludges are not flocculent whereas free-flowing sludges are highly so, and in fact the most desirable property to induce in a boiler sludge is high degree of flocculation, which comes about when a magnesia or magnesia/alumina gel is present in it though the dominant factor in the latter is the part played by the magnesia. Another desirable objective is for the crystal shape of the compounds constituting the sludge to be that of long needles, since these do not readily compact once they have settled.

We have discovered further that in all cases where the amount of magnesium compounds in a feed water has been adjusted to comply with the expression of our invention, the formation of calcium carbonate scale on surfaces inside the boiler is prevented or at least reduced to a negligible amount. It is not clear how this comes about since absence of scale makes it impossible to discover by analysis what part magnesium compounds play. It is known that some magnesium compounds can remove silica from water, and in so far as a calcium carbonate scale may have its tenacity increased by the presence of silicon compounds, removal of silica would weaken such scale but could not account for its not being formed at all. It may be that many examples of so-called calcium carbonate scale are in fact adherent deposits of compacted calcium carbonate sludge, and if that were so one would not expect to find evidence of scale whenever sludge was free-flowing.

In calculating the value of the expression $$\frac{100}{CaO}\left[\frac{MgO}{3} - \frac{2}{3}SiO_2\right]$$

one requires analytical data for the calcium, magnesium and silicon compounds present in the raw water. Thus the accuracy of the value depends on the accuracy with which these data are determined and on the experimental errors involved. In fixing a minimum value for the expression one ought therefore to take these things into account if the invention is to be practised successfully. Basing my calculations on analytical data of the highest accuracy I have found that if the value is less than 4 the chance of a sludge being free-flowing is so small as to be negligible; if between 4 and 7 some sludges are likely to be free-flowing, and if greater than 7 the probability of a sludge not being free-flowing is virtually zero. Likewise with regard to the formation of calcium carbonate scale: below a value of 4 scaling occurs readily, between 4 and 7 it is diminished in degree and above 7 it is substantially prevented altogether. To allow for large errors in analysis of the water and for inaccurate control of the process, one might recommend the minimum to be set at a higher value, for example 10, since in general the higher the value the more free-flowing the sludge, though beyond values of about 25 no significant improvement is obtained. But to set the minimum as high as 10 merely for such reasons would be to deny the force of the observations that it can be safely as low as 7 always, and in some cases as low as 4.

As discussed above, we now have found that it is not necessary, as far as sludge control and calcium carbonate scale prevention are concerned, to add aluminium compounds to the water but it is necessary to consider the circumstances that arise when the water already contains aluminum compounds.

There are examples of feed waters that contain small amounts of alumina, and it may sometimes be desirable to add aluminium compounds, for example sodium aluminate, to the water for other reasons. I have found that in such aluminium-containing waters the aluminium compounds may be ignored in calculating the value of the expression $$\frac{100}{CaO}\left[\frac{MgO}{3} - \frac{2}{3}SiO_2\right]$$

and provided the value is greater than 4 and preferably greater than 7 sludge formed in boilers fed with the waters will be free-flowing and calcium carbonate scale formation negligible. It has been stated that adjustment of the magnesium content of a water is supplementary to and in no way replaces the normal alkaline conditioning treatment given to boiler waters by known methods. In the same way it is supplementary to other treatments given to some waters from time to time for other purposes, for example the addition of antifoaming agents, or de-oxygenating agents including tannins. Among antifoaming agents compatible with the process of the invention are certain polyoxyalkylene glycols having a molecular weight greater than 1000, for example polyoxyethylene glycols and polyoxypropylene glycols; certain mono- and diethers of polyoxyalkylene glycols having molecular weights greater than 500, for example the mono-butyl ether of a polyoxypropylene glycol and the dicetyl ether of polyoxyethylene glycol; certain polyacyl polyamines, for example dipalmityl ethylene diamine. Among de-oxygenating agents sodium sulphite and sodium nitrite, tannins, hydrazine may be mentioned.

A convenient way of adjusting the concentration of magnesium compounds is by adding magnesium sulphate to the feed water. Preferably a solution of magnesium sulphate is continuously fed into a boiler feed water vessel, which may be supplied with entirely raw water or with a mixture of raw water and boiler condensate, whilst the alkalies required for the normal alkaline treatment are introduced directly into the boiler. The solution of magnesium sulphate may be supplied as such from a stock tank previously prepared, or on the other hand briquettes of, or containing, magnesium sulphate may be packed into a by-pass feeder and dissolved gradually as feed water passes over them. If desired other substances such for example as antifoaming agents and de-oxygenating agents may be incorporated with the magnesium sulphate in a briquette. Other magnesium compounds may be used, for example the nitrate, carbonate, chloride. Yet another method of adding magnesium compounds would be to make use of a base-exchange material able to remove calcium from the feed water and replace it with magnesium, regeneration being brought about by means of soluble magnesium salts.

Since under all ordinary working conditions within the scope of this invention substantially all the lime, magnesia, silica and alumina in a feed water appear in the boiler sludge, it is of interest to examine in the light of the invention the compositions of some actual boiler sludges. It has been possible to analyse the sludges from 26 working boilers of which 7 were free-flowing and 19 non-mobile. For the free-flowing sludges the values of the expression $$\frac{100}{CaO}\left[\frac{MgO}{3} - \frac{2}{3}SiO_2\right]$$

worked out to be respectively 18.9, 15.1, 13.3, 7.9, 6.9, 5.6 and 4.1. For the non-mobile sludges the values were 5.0, 4.7, 4.3, 4.2, 4.1, 3.3, 1.3, 0.8, 0.5, 0.4, 0.4, 0.0, −0.8, −0.8, −0.4, −1.1, −1.7, −1.8 and −6.1. Actual analytical data for the highest and lowest values in each group are given in the table below.

|  | Percent | | | | | moles per 100 moles CaO | | | Value |
|---|---|---|---|---|---|---|---|---|---|
|  | CaO | MgO | Al$_2$O$_3$ | P$_2$O$_5$ | SiO$_2$ | MgO | SiO$_2$ | Al$_2$O$_3$ |  |
| free-flowing | 33.60 | 16.86 | nil | 18.40 | 2.36 | 69.8 | 6.6 | nil | 18.9 |
| Do | 47.75 | 4.94 | 2.89 | nil | 0.58 | 14.4 | 1.1 | 3.3 | 4.1 |
| non-mobile | 49.56 | 5.63 | 0.06 | 1.42 | 0.16 | 15.8 | 0.3 | 0.1 | 5.0 |
| Do | 44.33 | 5.05 | 0.86 | 2.00 | 8.10 | 15.8 | 17.1 | 1.1 | −6.1 |

In the following examples, which further illustrate but do not restrict the invention, the expression $$\frac{100}{CaO}\left[\frac{MgO}{3} - \frac{2}{3}SiO_2\right]$$

is for convenience referred to as "the formula index."

Example 1

An "Economic" boiler working at a pressure of 100–120 p. s. i. and evaporating 6000–9000 gallons of water per 24 hours was being fed with a water which had in the raw state high calcium and low magnesium hardnesses respectively of 232 and 14 parts per million expressed as CaCO$_3$, and a medium silica content of 7 parts per million, and which was being treated with sodium carbonate and an anionic surface-active agent with dispersing properties. This boiler had a long history of intractable non-mobile sludge and had always showed a considerable degree of scale formation. The formula index for the feed water worked out to be approximately minus 1. The existing treatment was terminated and replaced by additions of caustic soda sufficient to maintain the total alkalinity equivalent to 500 parts per million of sodium carbonate. In addition magnesium sulphate solution was continuously fed in such amount as to raise the magnesium content of the feed to approximately 90 parts per million (as CaCO$_3$). With these proportions the formula index was just below 10. After four months under these conditions the boiler was examined and found to be virtually free from sludge, what there was being free-flowing. Test plates in the boiler were completely free of scale and a test area had deposit estimated at less than 0.001 inch in thickness.

Example 2

This is an example of a feed water of high calcium hardness and low magnesium hardness, namely respectively 288 and 16 parts per million expressed as CaCO$_3$, and of high silica content namely 21 parts per million. This water had been treated with various alkaline tannin mixtures and fed to a locomotive-type boiler working at 150 p. s. i. Non-mobile sludge formation had been considerable, and it had been necessary to wash out the boiler every six weeks. The formula index was approximately minus 5.5. The existing treatment was replaced by one based on caustic soda as in Example 1, and magnesium sulphate was added to bring the magnesium content to approximately 135 parts per million (as CaCO$_3$). The corresponding formula index was now approximately 8.3. After three months' working under the new conditions the boiler was completely clean.

This boiler was one of a pair of the same kind working side by side. The second one was operated concurrently in the same way and with the same treatment as the first except for an addition to the feed of sodium aluminate equivalent to 5 parts per million of Al$_2$O$_3$. Substantially equivalent results were obtained, the boiler after three months being completely clean.

Example 3

This is an example of a feed water of medium to high calcium hardness and fairly high magnesium hardness namely respectively 180 and 50 parts per million expressed as CaCO$_3$, and of medium silica content namely 10 parts per million. The formula index of this was approximately 3.7. The treatment had been based on sodium aluminate, sodium carbonate and starch, and sodium sulphite. The boiler was an "Economic" working at 80–100 p. s. i. evaporating 6000–9000 gallons per 24 hours with a raw water make-up of 30 to 60%. It contained a considerable amount of scale and had a long record of non-mobile sludge. The existing treatment was replaced by one based on sodium carbonate equivalent to 500 parts per million on the feed, and sodium sulphite equivalent to 70 parts per million, and magnesium sulphate was added to bring the total magnesium content of the feed to about 70 parts per million (as CaCO$_3$), and the formula index to just below 9.0. During the next 3½ months the sludge collected at the blowdown points was consistently highly flocculent and free-flowing, and at the end of the time the boiler was examined and found to be entirely free of adherent sludge. In addition the amount of scale formed on test plates and test areas was less than 0.001" in thickness.

Two further similar trials were carried out on this boiler in which operating conditions were as already described except that in one trial 10 parts per million of tannin were also added to the feed, and in the other 0.2 part per million also of an antifoaming agent composed substantially of the monobutyl ether of a mixed ethylene-propylene polyoxy glycol having a molecular weight of about 3500 and in which the weight ratio of ethylene oxide to 1.2-propylene oxide was 1:1. In both trials the boiler was found after three months to be free from adherent sludge and the scale formed on test plates to be less than 0.001" thick. The antifoaming agent had functioned normally, as shown by a marked reduction in the amount of deposits in the steam take-off, compared with the trial without added antifoaming agent.

Example 4

This example relates to a soft raw water having a calcium hardness of 12 parts per million (as CaCO$_3$), a magnesium hardness of 4 parts per million (as CaCO$_3$) and a silica content of 2 parts per million. The water was being treated with sodium phosphate, which is the conventional practice for soft waters, and being fed to an "Economic" boiler working at 85 p. s. i. with an evaporation of 16000 gallons/day and 100% make-up. The formula index was approximately minus 5.5. The phosphate treatment was replaced by one based on sodium carbonate and sufficient magnesium sulphate—about 2.5 lbs. of MgSO$_4$·7H$_2$O per day—to give a formula index of approximately 8.0. Samples of a sludge taken from the bottom blowdown were highly flocculent and free-flowing. After 3 months' steaming the boiler was opened for inspection; it contained no sludge and no new scale. After a further 52 days' steaming a similar result was obtained.

What I claim is:

1. A process for generating steam in a boiler while avoiding the formation of non-free-flowing, adherent sludges using boiler feed water including at least one sludge-forming material selected from the group consisting of calcium, magnesium and silicon compounds, said process comprising the steps of adjusting the concentration of magnesium compound present in said feed water so that the value of the expression $$\frac{100}{CaO}\left[\frac{MgO}{3} - \frac{2}{3}SiO_2\right]$$

in which CaO, MgO, SiO$_2$ are, respectively, the equivalents in moles of the calcium, magnesium and silicon compounds in the feed, is between 4 and 25, by adding to the feed water a readily water-soluble magnesium compound; and generating steam in said boiler from feed water having the thus adjusted concentration of magnesium compound whereby said sludge forming material is precipitated in said boiler in a free-flowing, non-adherent form.

2. The process of claim 1 wherein said water feed is treated with a tannin.

3. The process of claim 1 wherein said feed water is treated with sodium aluminate.

4. A process for generating steam in a boiler while avoiding the formation of a non-free-flowing, adherent sludge using boiler feed water having dissolved therein calcium, silicon and magnesium compounds which would normally tend to form said non-free-flowing adherent sludge, said process comprising the steps of adjusting the concentration of magnesium compounds in said feed water so that the value of the expression $$\frac{100}{CaO}\left[\frac{MgO}{3} - \frac{2}{3}SiO_2\right]$$

in which CaO, MgO and SiO$_2$ are, respectively, the equivalents in moles of calcium, magnesium and silicon compounds in the feed, is between 7 and 25, by adding to the feed water a readily water-soluble magnesium compound; and generating steam in said boiler from feed water having the thus adjusted concentration of magnesium compounds whereby said dissolved calcium, silicon and magnesium compounds are precipitated in said boiler in the form of a free-flowing, non-adherent, readily removable sludge.

5. The process of claim 4 wherein the concentration of magnesium compounds is adjusted by adding magnesium sulphate to said feed water.

References Cited in the file of this patent

UNITED STATES PATENTS

| | | |
|---|---|---|
| 206,161 | Bohlig | July 23, 1878 |
| 2,307,466 | Noll et al. | Jan. 5, 1943 |
| 2,627,502 | Bird | Feb. 3, 1953 |
| 2,727,867 | Denman | Dec. 20, 1955 |

FOREIGN PATENTS

| | | |
|---|---|---|
| 4,536 | Great Britain | Dec. 1, 1877 |
| 12,875 | Great Britain | Jan. 8, 1903 |